United States Patent [19]
Henricson

[11] Patent Number: 5,340,440
[45] Date of Patent: Aug. 23, 1994

[54] METHOD FOR RECOVERING CHEMICALS USING RECOVERY BOILER HAVING AT LEAST 2 DIFFERENT MELT SECTIONS

[75] Inventor: Kaj Henricson, Kotka, Finland

[73] Assignee: A. Ahlstrom Corporation, Noormarkku, Finland

[21] Appl. No.: 915,235

[22] Filed: Jul. 20, 1992

[30] Foreign Application Priority Data

Sep. 9, 1991 [FI] Finland ........................ 914252
Nov. 21, 1991 [FI] Finland ........................ 915482

[51] Int. Cl.⁵ ............................................. D21C 11/12
[52] U.S. Cl. ........................................ 162/31; 162/29; 162/30.1; 162/30.11; 162/90
[58] Field of Search .................. 162/29, 30.1, 30.11, 162/31, 90

[56] References Cited

U.S. PATENT DOCUMENTS 4,929,307  5/1990  Kiiskila et al. ................ 159/47.3

FOREIGN PATENT DOCUMENTS 1155113  9/1987  Japan ........................... 162/31
9108337  6/1991  PCT Int'l Appl. .

OTHER PUBLICATIONS

Ayala et al, "Evaluation of Oxidized White Liquor as an Alkali Source", Tappi Oxygen Delig. Symposium, Oct. 1990.

K. Baczynska, "Use of White & Green Liquors as Alkalis in the Oxygen Stage of Kraft Pulp," Przeglad Papier, Miczy 35 No. 6:193–195 (Jun. 1979).

Primary Examiner—Jones W. Gary
Assistant Examiner—Dean T. Nguyen
Attorney, Agent, or Firm—Nixon & Vanderhye

[57] ABSTRACT

Chemicals are recovered during the production of cellulose pulp by forming two different sulfidity melts in two different sections of a soda recovery boiler, and then producing cooking liquors from different melts in dissolving tanks. The liquors may be causticized and/or oxidized, or may be utilized uncausticized. Uncausticized green liquor having a sulfidity of about 70–90% may be used early in a kraft cooking cycle, followed by treatment with low sulfidity oxidized and causticized white liquor. In the continuous digestion of cellulosic pulp, oxygen may be added to the recirculation loops below the black liquor withdrawal to enhance the alkalinity of the slurry and to assist in delignification. Oxidized cooking liquor with low sulfidity can be added to oxygen bleaching and alkali extraction stages downstream of the digester, and a portion of the high sulfidity cooking liquor can be used to produce acid used in an ozone bleaching stage.

17 Claims, 5 Drawing Sheets

METHOD FOR RECOVERING CHEMICALS USING RECOVERY BOILER HAVING AT LEAST 2 DIFFERENT MELT SECTIONS

BACKGROUND AND SUMMARY OF THE INVENTION

As disclosed in pending application Ser. No. 7/788,151, filed Nov. 5, 1991 now abandoned there are circumstances in which it is desirable to produce two different cooking liquors having different sulfidity in the production of cellulosic pulp, particularly in the production of kraft or sulfite paper pulp. The invention relates to a particular manner of effecting production of the two different cooking liquors, by forming two different melts in a soda recovery boiler. Utilizing this basic concept, it has been found that a wide diversity of pulp treatment procedures may then be employed, utilizing a wide variety of different types of cooking liquors. For example, it has been found that when it is practical to make different cooking liquors from different melts, under some circumstances it is not necessary to causticize the melts after they are dissolved, but rather they have a high enough sulfidity to use the liquor produced (e.g. green liquor) directly in the early stages of pulp cooking. Also, it has been found according to the invention that by oxidizing various pulp treating liquids, the alkali content thereof can be increased, which is useful both at the end of the digestion process, and in some subsequent treatment stages such as oxygen bleaching and alkali extraction. Alternatively, or in addition, it has been found that using a high sulfidity liquor, acid can be manufactured which is used in subsequent acidic treatments of the pulp, such as ozone bleaching.

The methods according to the invention are facilitated by utilizing a pulp mill having a recovery boiler with two different melt producing volumes. The conditions within the volumes may be kept separate; for example, one volume may have oxidizing conditions and the other reducing conditions. Also, the amount of sulfur in the waste gases that are discharged can be reduced by providing the low sulfidity melt producing volume above the high sulfidity melt producing volume so that sodium containing off gases from the low sulfidity melt producing volume will react with sulfur and the off gases from the high sulfidity melt producing volume to produce compounds that are more easily removed from the waste gas stream.

According to one aspect of the present invention, a method of recovering chemicals during the production of cellulose pulp using sulfur-containing chemicals is provided. The method comprises the following steps: (a) Providing a first fluid waste stream of sulfur-containing chemicals from the production of cellulose pulp, having a first sulfur content. (b) Providing a second fluid waste stream of sulfur-containing chemicals from the production of cellulose pulp having a second sulfur content, greater than the first sulfur content. (c) Combusting the first and second fluid waste streams separately to produce first and second melts, the second melt having the second sulfur content, and the first melt the first sulfur content. And (d) dissolving the first and second melts to produce first and second liquors, the first liquor having the first sulfur content, and the second liquor having the second sulfur content. The first and second fluid waste streams are preferably formed by heating a waste liquor (e.g. black liquor) to drive off sulfur-containing gases (such as DMS), recovering the sulfur from the sulfur-containing gases, splitting the heated waste liquor into the first and second different waste gas streams prior to step (c), and prior to or coincident with step (c) adding the recovered sulfur to only the second of the split streams.

Steps (a)–(d) are preferably practiced to produce a first liquor having a sulfidity of about 30% or less, and a second liquor having a sulfidity of about 40% or more, typically about 60–90%, and—where the second liquor is to be used uncausticized in early stages of kraft cooking—a sulfidty of about 70–90%. There is also preferably the further step (e) of adding other sulfur-containing constituents from the production of cellulose pulp to the second split stream prior to or coincident with the practice of step (c) for that stream. The constituents added to the second split stream may contain one or more of the following: flyash from the soda recovery boiler, waste acid from a tall-oil plant, waste acid from a chlorine dioxide plant, and sulfurous discharge gas from a pulp digester.

The first liquor may be treated with oxygen to increase the hydroxide ion concentration thereof, and then practicing a further step of, without intervening causticization treating the cellulose pulp in later stages of cook with the hydroxide-ion concentration enhanced first liquid. The first and second liquids may or may not be causticized depending upon the particular treatment sequences and the uses to which they will be put.

The invention also comprises a method of continuously producing cellulose pulp utilizing a continuous digester and first and second sulfur-containing cooking liquors, comprising the following steps: (a) Feeding comminuted cellulose material slurry entrained in the second sulfur-containing cooking liquor into the top of the continuous digester, the slurry moving downwardly in the digester during treatment. (b) Withdrawing black liquor from a first portion of the digester. (c) Below the first portion of the digester, withdrawing treatment liquor and recirculating it, and adding the first sulfur-containing cooking liquor to the withdrawn treatment liquor prior to recirculation. And (d) adding oxygen to the recirculated liquor. Step (d) is practiced to significantly raise the hydroxide ion concentration and thus the alkalinity of the slurry, and to assist in delignification. Typically the first cooking liquor has a lower sulfur content than the second cooking liquor (e.g. about 30% or below compared to about 50% or above). The black liquor withdrawn in step (b) is acted upon as by heating pursuant to the procedure disclosed in U.S Pat. No. 4,929,307 (the disclosure of which is hereby incorporated by reference herein) to produce two different fluid waste streams, which are used to produce two different melts as described above.

The invention also comprises a method of producing cellulose pulp from a slurry of comminuted cellulose material by the following steps: (a) Digesting the slurry by subjecting it to cooking with sulfur-containing cooking liquor at digesting conditions, black liquor being produced in the process. (b) Withdrawing black liquor produced during step (a). (c) Treating the pulp after step (a) in several alkali or acid treatment stages. (d) Producing cooking liquor from the black liquor withdrawn in step (b). (e) Oxidizing some of the cooking liquor from step (d) to increase the hydroxide ion concentration thereof. And (f) using the oxidized cooking liquor from step (e) to increase the alkali content during the practice of at least one of the alkali treatment stages of step (c). Step (c) includes oxygen bleaching and alkali extraction stages, and step (f) is practiced to add oxidized waste liquor to the oxygen bleaching and alkali extraction stages. At least a portion of the oxidized white liquor is recovered from step (f) utilizing countercurrent washing, and it is utilized in step (a). There may also be the step of utilizing a portion of the second melt or the second cooking liquor to produce acid, and then utilizing the acid in at least one acid treatment stage (e.g an ozone bleaching stage) during the practice of step (c). However, the acid can also be produced from sulfurous gases generated in the heat treatment of the black liquor.

According to still another aspect of the present invention, a method of kraft digesting comminuted cellulosic fibrous material is provided. The method comprises the steps of: (a) First treating the cellulosic material, in slurry form, with uncausticized green liquor having a sulfidity of about 70-90% at kraft digestion conditions, and then (b) treating the slurry with a second sulfur-containing liquor having a sulfidity of about 30% or less. Step (b) may be practiced with a causticized, oxidized, white liquid.

The invention also relates to a pulp mill and a soda recovery boiler. The pulp mill comprises: (a) Means for providing a first fluid waste stream of sulfur-containing chemicals from the production of cellulose pulp, having a first sulfur content. (b) Means for providing a second fluid waste stream of sulfur-containing chemicals from the production of cellulose pulp having a second sulfur content, greater than the first sulfur content. (c) Means for combusting the first and second fluid waste streams separately to produce first and second melts, the second melt having the second sulfur content, and the first melt the first sulfur content. And (d) means for dissolving the first and second melts to produce first and second liquors, the first liquor having the first sulfur content, and the second liquor having the second sulfur content. The means (c) preferably comprises a soda recovery boiler having at least two different melt sections and a common waste gas discharge, the first melt being produced in a first melt section, and the second melt in a second melt section. The first melt section may be vertically above and spaced from the second melt section, the first section discharging gases into the common waste gas discharge substantially above the discharge of gases from the second melt section into the common waste gas discharge. The first and second liquors may be separately clarified and causticized to produce a common supply of lime mud, and the lime mud may be fed to a lime reburning kiln to be calcinated.

The soda recovery boiler according to the invention comprises: A combustion chamber. Partition means for dividing the combustion chamber into first and second melt producing volumes. Means for adding a first fluid stream to only the first melt producing volume. Means for adding a second fluid stream to only the second melt producing volume. Means for withdrawing a first melt from only the first melt producing volume. Means for withdrawing a second melt from only the second melt producing volume. And a common waste gas discharge from the combustion chamber. The boiler according to the invention can have the modifications described above depending on the type of the pulp mill.

According to the present invention it is possible to produce pulp having a low kappa number, and good strength, with a high yield of pulp, and/or to minimize sulfur emissions from the mill. In view of the enhanced qualities of pulp produced according to the invention it is possible to eliminate chlorine and chlorine dioxide as bleaching chemicals, thus further minimizing any adverse environmental impact from the pulp mill.

The invention is particularly suited for combination with extended delignification kraft pulping techniques, such as the Kamyr, Inc. modified continuous cooking and extended modified continuous cooking techniques. In such techniques, about 60-80% of the total amount of white liquor is added at the beginning of the cook, while the rest is added at the end of the cook. By utilizing different sulfidity cooking liquors in the practice of these extended delignification kraft cooks, the results can be enhanced.

In sulphate cooking wood is treated with white liquor containing NaOH and $Na_2S$, so that lignin is dissolved and the cellulose fibers are released. The mixture of cellulose fibers (pulp) and cooking chemicals is treated with waster so that black liquor is generated. The black liquor is concentrated by evaporation. The concentrated black liquor is combusted in a soda recovery boiler and the chemical melt thus formed and mainly containing $Na_2S$ and $Na_2CO3$ is dissolved into water, whereby green liquor is formed. The green liquor is then causticized with caustic lime (CaO) to white liquor containing NaOH. Another product of the causticization reaction is lime mud primarily being formed from $CaCO_3$. The white liquor is supplied to a digester house and the lime mud is calcinated in a lime sludge reburning kiln to be reused as caustic lime during the causticization.

The pulp discharged from the digester may be, if desired, bleached. In order to decrease harmful environmental effects the cellulose pulping industry is striving to replace conventional chlorine bleaching with other alternatives, for example, by use of ozone. In ozone bleaching the pulp exiting the cooking apparatus is prebleached with oxygen under alkali conditions. Thereafter, the pulp is bleached with ozone, which is succeeded by alkali extraction. The alkali used in the oxygen bleaching and alkali extraction stage is oxidized white liquor. After each treatment the pulp is washed to remove the chemicals from the pulp, for example, by countercurrent washing. The washing agent from the last washing stage, to which the chemicals have been concentrated, is led to the recovery process of the chemicals.

The various detailed features of the invention will become clear from an inspection of the detailed description of the invention and from the appended claims.

DETAILED DESCRIPTION OF THE DRAWINGS

Figure 1:
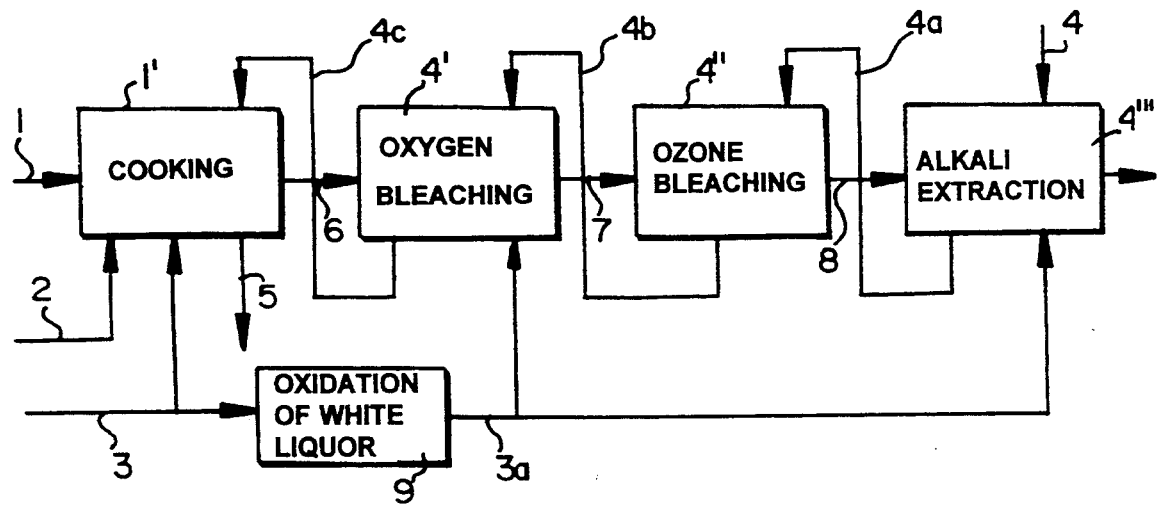
FIG. 1 is a schematic flow sheet illustrating cooking and subsequent treatment of cellulose pulp employing some of the techniques according to the present invention.

According to FIG. 1, wood chips 1, as well as cooking liquor, are introduced to a digester 1'. In accordance with the present invention high sulfidity white liquor 2 is supplied to the beginning of the cook, and during the cook low sulfidity liquor 3 is gradually added thereto. Alternatively, non-causticized green liquor high in sulfur may be added to the beginning of the cooking. The sulfidity of the high sulfidity cooking liquor is preferably above 40% and that of the low sulfidity about 30% or less. When using uncausticized high sulfidity cooking liquor, the sulfidity is preferably above 60%, typically about 70–90%. By so cooking, a low kappa number is achieved as well as a good pulp quality. At the end of the cook the pulp is separated from the waste liquor by washing, for example, with a countercurrent washing agent 4c from the bleaching plant. The waste liquor and the waste water 5 are led to the chemical recovery processes. The unbleached pulp 6 is supplied to the bleaching plant.

The pulp 6 is typically first prebleached with oxygen under alkali conditions at 4'. The alkali used is preferably low sulfidity white liquor 3a, which is oxidized to deactivate sulfides at 9. Subsequent to the oxygen bleaching at 4', the pulp is washed again using washing agent 4b flowing countercurrently from the next stage. The washed pulp 7 is thereafter bleached with ozone under acidic conditions in 4''.

The pH of the ozone bleaching stage is decreased either by the waste acid from a chlorine dioxide plant—operating, for example, with Mathieson, R8 and R9 processes—or using acid obtained therefrom, or using acid obtained from cooking chemical circulation. In the latter case, the acid can be produced, for example, from sulfurous gas, which is generated in the heat treatment of black liquor or the combustion of odorous gases. An alternative acid source is also the waste acid from a tall-oil digester house.

Subsequent to the ozone bleaching at 4'', the pulp is washed, as in the previous stages, with a washing agent 4a from a subsequent stage, whereby a portion of the acid used for the adjustment of pH is returned to the chemical circulation. Thereafter, the pulp 8 is led to alkali extraction at 4'''. The pH is adjusted, as in oxygen bleaching, with a low sulfidity, oxidized white liquor 3a. A portion of the chemicals in the white liquor is returned to the chemical circulation when the pulp is finally washed in countercurrent washing.

In the prior art it is possible to achieve a kappa number of about 10 with the present pulp manufacturing processes, which comprise cooking, oxygen bleaching and ozone bleaching, whereby the pulp must yet be bleached with chlorine. By utilizing a method in accordance with the present invention it is possible to achieve a kappa number of approximately 2, so that the use of chlorine may be avoided.

In the art, the black liquor formed during cooking is concentrated, and combusted in a soda recovery boiler for generating a melt containing sodium carbonate and sodium sulfide. The melt is dissolved into water to form green liquor. The green liquor typically is reacted with CaO (i.e is causticized) to produce white liquor containing NaOH and $Na_2S$.

The viscosity of black liquor may be irreversibly decreased and thus evaporability thereof may be improved by the heat treatment of black liquor at a temperature higher than the cooking temperature (as in U.S. Pat. No. 4,929,307). Sulfurous gases are released from black liquor during heat treatment, and thus by adjusting the temperature and/or the retention time, it is possible to affect the sulfur content of black liquor, as in Finnish published application 85515 and copending U.S. application Ser. No. 07/840,080 (pending) filed Feb. 21, 1992, and copending U.S. application Ser. No. 07/788,151 filed Nov. 5, 1991 now abandoned.

Figure 2:
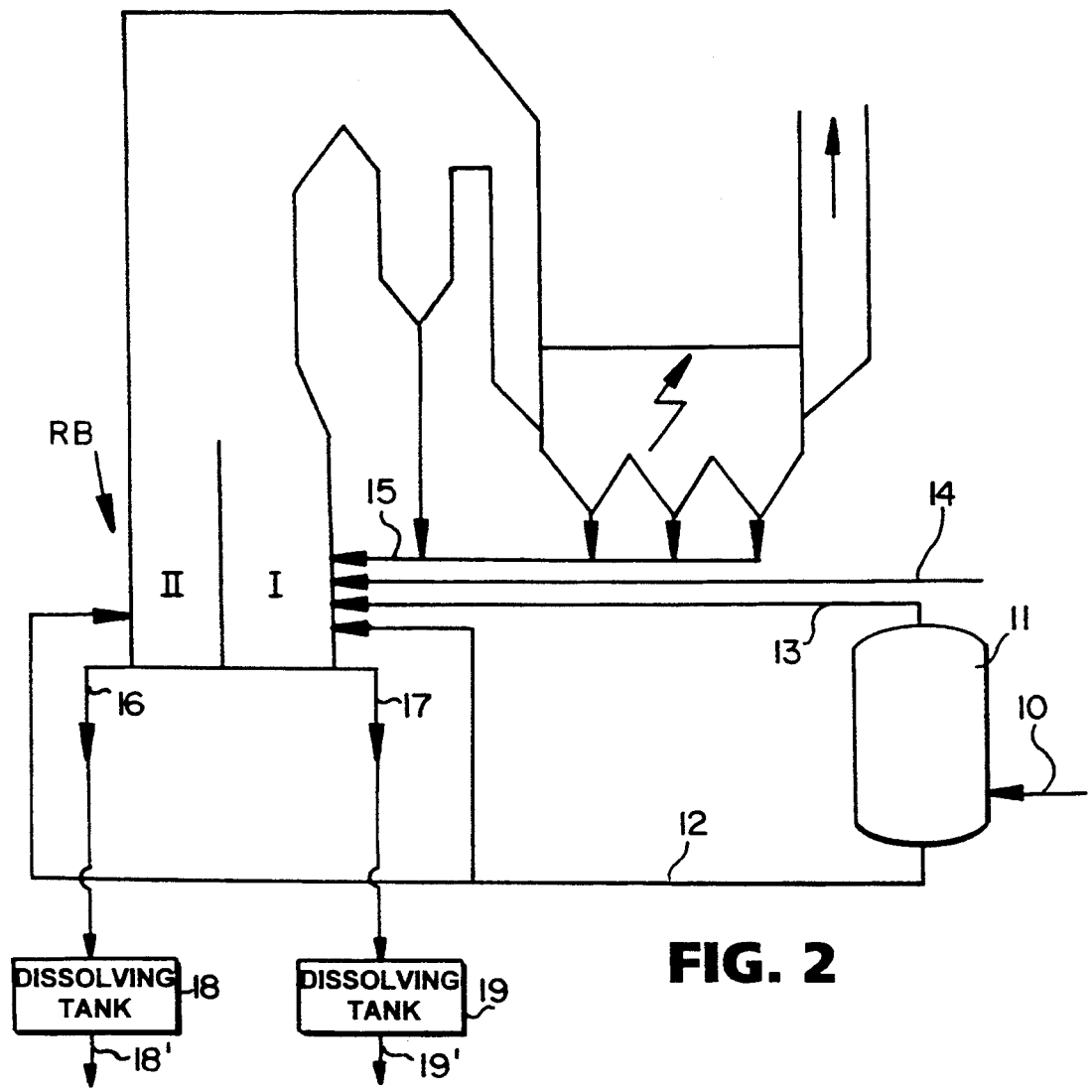
FIG. 2 is a schematic illustration of an exemplary embodiment of apparatus for manufacture of two different sulfidity cooking liquors from two different melts.

The cooking liquors of different sulfur contents required in a pulp mill in accordance with the present invention are manufactured from melts having different sulfur contents. Such melts are possible to produce by using a soda recovery boiler RB in accordance with the invention, the lower part of which is divided by a partition wall into two (or more) sections, as illustrated in FIG. 2. The concentrated black liquor is distributed into both sections. The wash (fly ash) from the electric filters of a soda recovery boiler and also other sulfur sources of a pulp mill, such as sulfurous gases from a digester house, are led to the melt in the combustion space of a second section of RB at the bottom, to a bed on the melt, or to a gas space by means of supply means associated with the boiler RB. Accordingly another melt is formed on the other side. The melts are transferred to a white liquor production plant in accordance with the present invention, in which they are dissolved separately in individual dissolving tanks, respectively. The green liquors generated thereby are each brought through individual green liquor clarifiers to individual causticizing tanks 18, 19, respectively. Two different cooking liquors 18', 19' are thus generated, one of which is of high sulfide content and the other of low sulfide content. The highly sulfurous green liquor 19' may remain non-causticized, especially if the pH value of the cooking is desired to be maintained low or if the $Na_2CO_3$ content of the green liquor is low.

If the cooking liquors 18', 19' are (separately) causticized, the lime muds produced may be combined so that washing of the lime mud and the combustion of the lime sludge in reburning kiln may be carried out in one stage. Alternatively, the lime muds may be washed separately and be joined just before combustion.

FIG. 2 illustrates an exemplary embodiment in accordance with the present invention, in which sulfurous compounds may be distributed to different sections of a soda recovery boiler RB for the manufacture of different melts. The concentrated black liquor 10 is brought from the evaporation plant and heat treated by pressure heating at 11 (e.g. according to USP 4,929,307), whereby sulfurous gases 13 are formed and in which gases, for example, 40% of the sulfur of the black liquor is entrained. Black liquor 12, the sulfur content of which is thus decreased, is evenly distributed between sections I and II at the bottom of the soda recovery boiler RB. Also, other sulfur sources of the pulp mill in addition to the sulfur gas 13 generated in the pressure heating, such as fly ash 15 and sulfurous gases 14, are passed to the section I, the section I producing a high sulfidity melt 17. Melt 17 contains about 70% of the sulfur in the black liquor 10 and also some sulfur from other possible sulfur sources. The low sulfidity melt 16 thus includes about 30% of the total sulfur amount of the black liquor.

Black liquor may, of course, be divided at any desired proportions between the different portions of the soda recovery boiler. Thus, it is also possible to influence the sulfur distribution between different portions. A high sulfidity cooking liquor can thus have sulfidities, for example, from 40% to 90%, and a low sulfidity one can have sulfidities from 10% to 30%.

After the melts 16, 17 are formed, they are directed to dissolving tanks 18, 19, respectively, to produce different sulfur content liquors 18′, 19′, respectively.

The heat treatment of black liquor is not an absolute necessity to bring about the sulfidity differences. If, for example, only the ash in the soda recovery boiler, which includes about 30% of the total sulfur content and 15% of the sodium, is passed to one section (I) and black liquor is evenly distributed to different sections (I, II), 65% of the total amount of sulfur and 55% of the total amount of sodium is obtained on the highly sulfurous side. While the original sulfidity of white liquor was 35%, the white liquors thus obtained would have sulfidities of about 40 and 30%.

Figure 3:
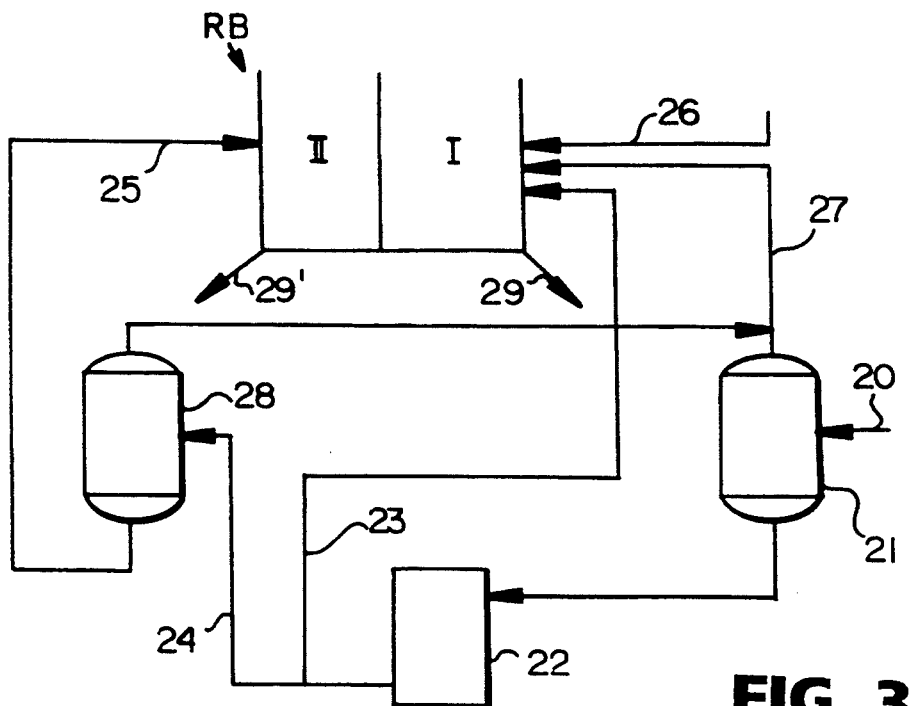
FIGS. 3 and 4 illustrate alternative configurations of equipment for accomplishing the same basic objective as the equipment in FIG. 2.

FIG. 3 illustrates another exemplary embodiment for the manufacture of white liquors having different sulfur contents. The pre-evaporator black liquor 20 is heat treated in a reactor 21 to decrease the viscosity of the liquor for the final evaporation. The black liquor concentrated in the evaporator 22 is divided into two so that one portion 23 is led directly to the section I at the bottom of the soda recovery boiler RB. The other portion 24 is heated treated in vessel 28 to further decrease the sulfur content thereof. The black liquor 25 thus treated is brought to section II, where it is combusted to low sulfidity melt. The ash 26 of the soda recovery boiler RB and the sulfurous gases 27 from both of the heat treatment reactors 21, 28 are added to the section I of the boiler RB. In this case, different conditions may be used in different heat treatment stages, and thus control the sulfur distribution.

Figure 4:
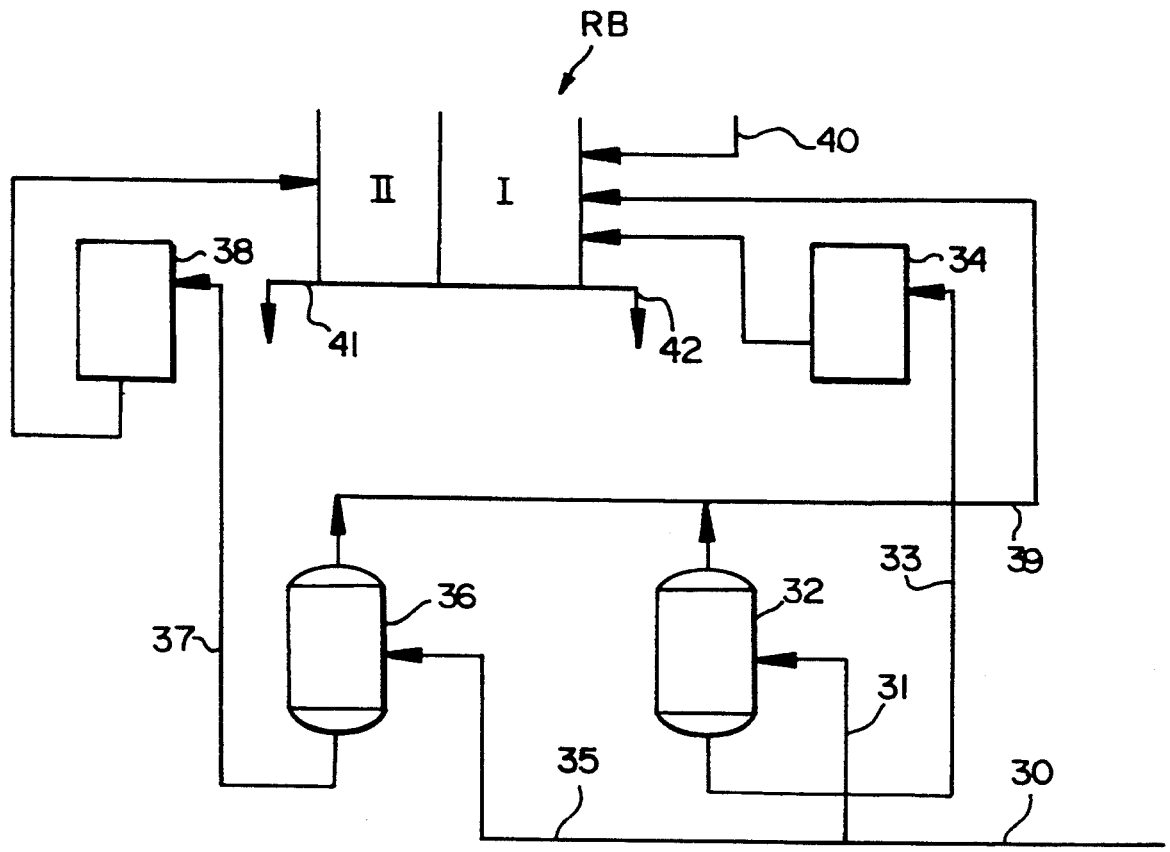

FIG. 4 illustrates an alternative construction to the embodiment in accordance with FIG. 3. The pre-evaporated black liquor 30 is divided into two. A portion 31 is supplied to the heat treatment reactor 32, in which liquor is heated to decrease the viscosity. Then the liquor 33 is concentrated in the evaporator 34 and guided to the bottom section I of the soda recovery boiler RB. The other portion 35 of the pre-evaporated black liquor is guided to a more intensive heat treatment in the reactor 36 to decrease the viscosity and to achieve an effective sulfur separation. The low sulfidity black liquor 37 thus obtained is evaporated in an evaporator 38 and passed to section II at the bottom of the soda recovery boiler RB in order to obtain the low sulfidity melt 41. The sulfurous gases 39 generated in both heat treatments, ash 40, and other possible sulfur sources are guided to the section I of the soda recovery boiler in order to obtain high sulfidity melt 42. It is, of course, also possible to separate sulfurous gases by other means like gasification, pyrolysis or the like, to create sulfidity differences.

Figure 5:
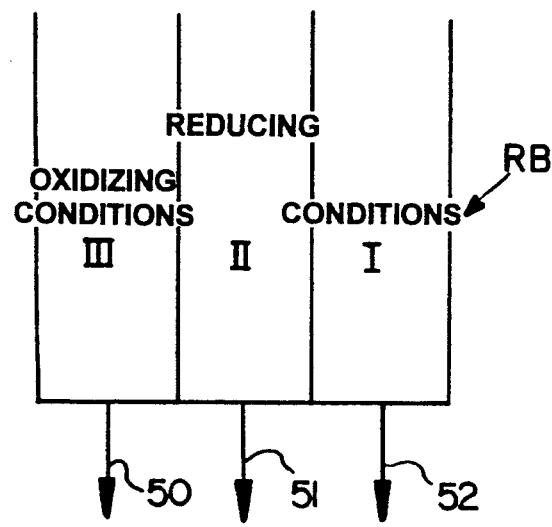
FIG. 5 schematically illustrates a recovery boiler used in the manufacture of oxidized white liquor.

FIG. 5 illustrates yet another embodiment in accordance with the present invention, according to which it is possible to produce oxidized white liquor, which is required in the bleaching plant. The bottom of the soda recovery boiler RB is divided into several sections I, II and III. Sections II and III contain low sulfidity melt and section I high sulfidity melt. By maintaining oxidizing conditions in section III containing low sulfidity melt, it is possible to get oxidized low sulfidity melt 50 containing $Na_2SO_4$. The two sections I and II have reducing conditions, whereby high $Na_2S$-containing melt 52 and low $Na_2S$-containing melt 51 are formed. Thus, it is possible to carry out the oxidization of white liquor and thus eliminate one of the odor sources in a pulp mill.

Figure 6:
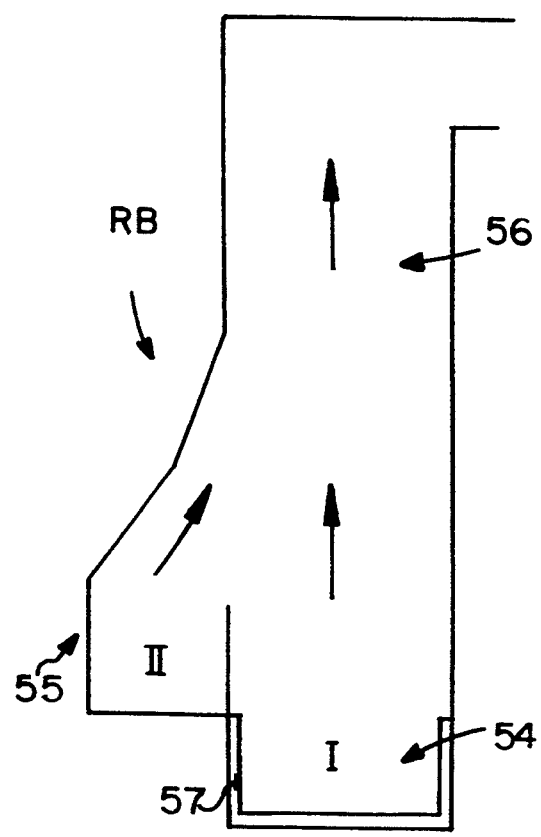
FIG. 6 schematically illustrates an alternative boiler construction of a soda recovery boiler in accordance with the present invention.

FIG. 6 illustrates an alternative partition means for dividing the bottom of a soda recovery boiler into sections I and II for the manufacture of melts having different sulfur contents. By arranging section I containing high sulfidity melt lower than section II containing low sulfidity melt, the discharge gases of the high sulfuric section rise into contact with the gases of the low sulfuric section containing sodium. Thus, the sulfurous compounds react with sodium vapors and are recovered in conventional electric filters (electrostatic precipitators). Consequently, it is possible to decrease the sulfur emissions of a soda recovery boiler RB. Alternatively, it is possible to arrange a high sulfidity section in the middle of a soda recovery boiler, whereby a low sulfidity portion surrounds it. Thus, the discharge gases of the high sulfidity portion are divided evenly in the gases of the low sulfurous portion.

A soda recovery boiler plant in accordance with the present invention may comprise also at least two individual boilers. According to one embodiment the boilers share a heat recovery system, and in addition to that they may share a flue gas cleaning system. Alternatively, the boilers may be entirely separate. The ash recovered from the common flue gas cleaning system is returned to one of the boilers, whereby the highly sulfurous melt is naturally obtained in said boiler. If the boilers are entirely separate, the ashes recovered therefrom are returned only to one of the boilers to form the highly sulfurous melt.

In order to control the corrosion problems at least a portion of the soda recovery boiler RB, which is in contact with the high sulfuric melt, is preferably coated. An appropriate coating is a refractory lining, which may extend also to the area, which contains a lot of sulfur gases, e.g., see lining 57 in FIG. 6. The refractory lining 57 may extend more than 10 m above the melt surface.

Figure 7:
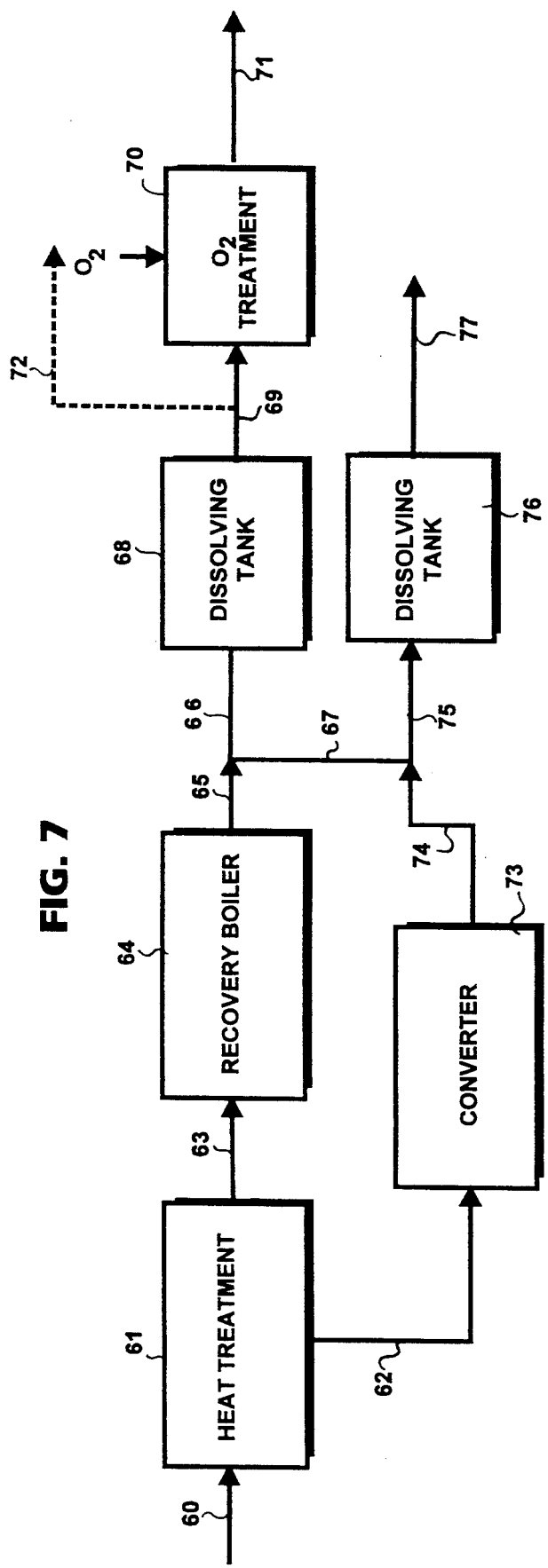
FIG. 7 is a schematic diagram illustrating one alternative method of producing different sulfidity liquors according to the invention.

FIG. 7 schematically illustrates a modified method according to the present invention in which black liquor 60 from the digester is fed to the heat treatment apparatus 61 (as in U.S. Pat. No. 4,929,307), and treated, e.g. at a temperature of about 200° C., for an extended period of time. Sulfur-containing gases such as dimethyl sulfide, methylmercaptan and hydrogen sulfide pass into line 62, and the more concentrated black liquor, but with a lower sulfur content, in line 63 to recovery boiler 64. In the heat treatment stage 61 over 50% of the sulfur may be separated so that the sulfidity of the black liquor in line 63 is about half of its normal sulfidity of about 30–40%. By controlling the heat treatment conditions, the amount of sulfur can be controlled.

After combustion of the black liquor in the recovery boiler 64, a melt 65 is obtained. A portion of the melt passes in line 66 while another portion passes in line 67. Line 66 is connected to a conventional dissolving tank 68 which produces green liquor in line 69. Preferably, the green liquor in line 69 is subjected to an oxygen treatment in which oxygen is brought into contact with the green liquor to enhance the hydroxide ion concentration (alkalinity). Oxygen added to the oxygen treatment apparatus 70 may be excess oxygen from an ozone bleaching stage. The conversion of the sulfur component of the green liquor in line 69 is as follows: $4 S^{2-} + O_2 + 2 H_2O = 2 S_2^{2-} + 4 OH^-$ and other corresponding reactions, providing an increase in $OH^-$ concentration of the liquor (71). This makes the liquor more suitable for a cooking liquor at the end of the cook. By treating the cooking liquor in this way, the need to causticize it is greatly reduced. The oxygen treated green liquor from 71 is used at the end of the cooking process without causticizing it, or fed to stages 4' and 4''' (see FIG. 1). Alternatively, as indicated in dotted line at 72 in FIG. 7, the low sulfidity cooking liquor may bypass the oxygen treatment and be used directly in the later stages of the cook, for oxygen or alkali stages, or the like.

The second portion of the melt from recovery boiler 64 in line 67 is not dissolved as such, but rather it is combined with recovered sulfur. Recovered sulfur is obtained by passing the sulfur-containing gases in line 62 to a converter 73 (utilizing apparatus such as described in copending application Ser. No. 07/840,080, filed Feb. 21, 1992 (pending) or Ser. No. 07/788,151, filed Nov. 5, 1991 now abandoned). The sulfur-containing compounds in line 74 are combined with the melt from line 67 to produce a very high sulfidity melt 75, which then passes into a dissolving tank 76 to produce a liquor in line 77 that has a sulfidity of over 50%, and preferably about 60–90%. The liquid in line 77 is added to the beginning of the cook. It is possible to use the liquor in line 77 directly for cooking, without causticizing it, if it has a sulfidity level above about 70%.

Figure 8:
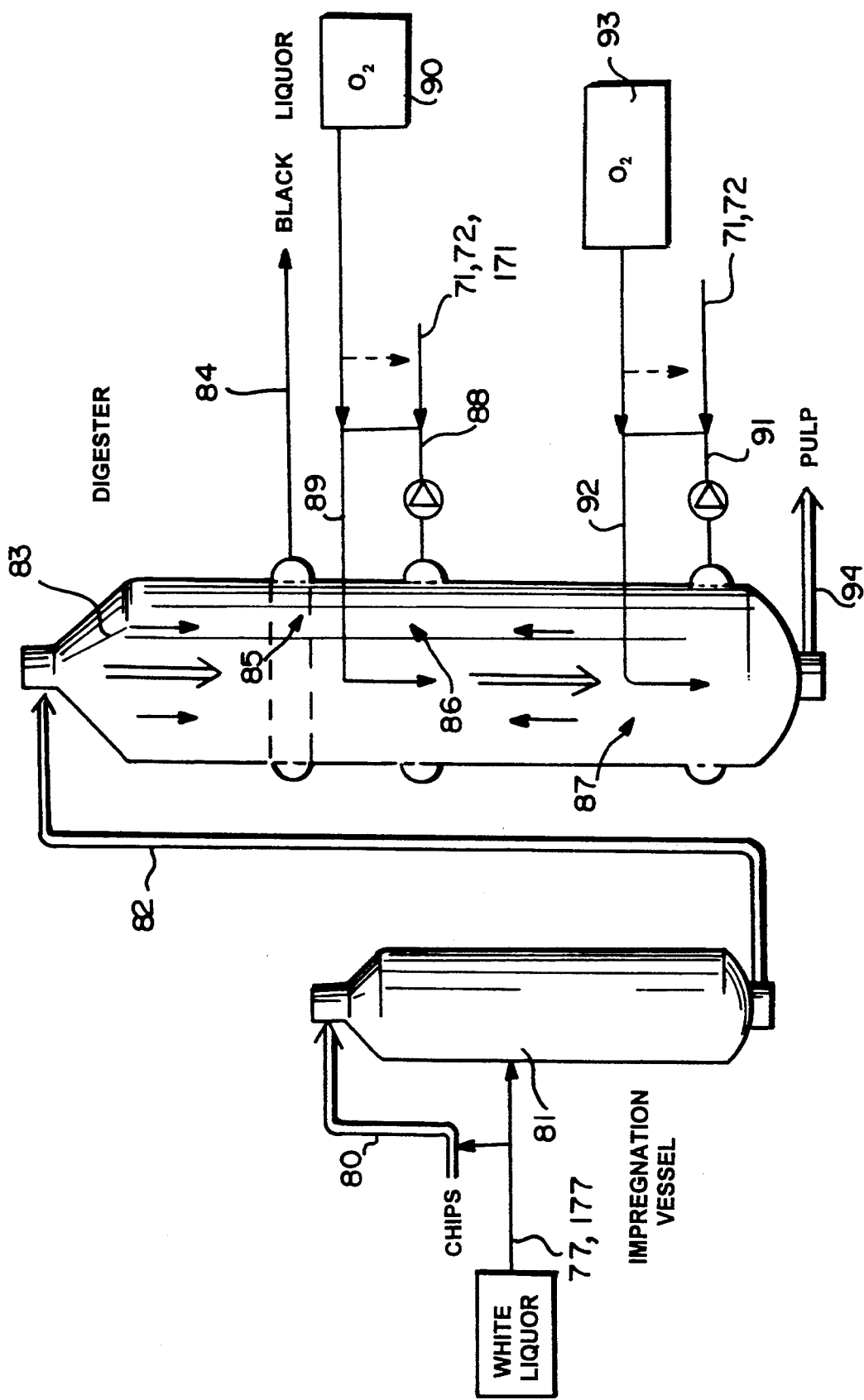
FIG. 8 is a schematic representation of apparatus utilized to practice various method aspects of the invention, particularly during extended modified continuous cooking of kraft or sulfite pulp.

FIG. 8 schematically illustrates apparatus for digesting comminuted cellulosic fibrous material to produce paper pulp, particularly in the kraft and sulfite processes in which cooking liquor containing sulfur compounds is utilized. The comminuted cellulose material is fed in line 80, ultimately to the digester but preferably through an impregnation vessel 81 in which high sulfidity cooking (e.g. white or green) liquor, e.g. from line 77 of FIG. 7, is added. The cellulose entrained in high sulfidity cooking liquor passes in conduit 82 to the top of the digester 83. Black liquor is withdrawn in line 84 through screens 85, and is used as the feed liquor for the lines 10, 20, 30 or 60 in FIGS. 2 through 4 and 7 respectively. Lower in the continuous digester 83, below the black liquor screens 85, are two circulation loops 86, 87, the loop 87 being a wash circulation loop. Spent treatment liquid is withdrawn in line 88 in loop 86 to which low sulfur content white liquor (e.g. from 71, 72) is added, and then is returned in line 89 to the digester 83. The addition of white liquor in a circulation loop 86 is known per se, utilized in the Kamyr, Inc. MCC ™ process. However, according to the invention, the cooking liquor added in line 88 is low sulfidity cooking liquor.

Also according to the invention oxygen can be added to the liquor in line 89. The oxygen from source 90 added in line 89 converts sulfur ions to obtain hydroxide ions to raise the alkalinity, and ultimately helps delignify the pulp at the end of the cook.

In the circulation loop 87, spent liquid is withdrawn in line 91, and again low sulfidity cooking liquor from lines 71 or 72 is added. The addition of white liquor to a wash circulation loop 87 is known per se but in the Kamyr, Inc. EMCC ™ process. The liquor returned in line 92 can be made more alkaline by the addition of oxygen from source 93, as with the first circulation loop 86. The final paper pulp produced is discharged in line 94, and then is led to further stages (such as the oxygen, ozone, and alkali stages 4' 4'' and 41''' illustrated in FIG. 1).

Figure 9:
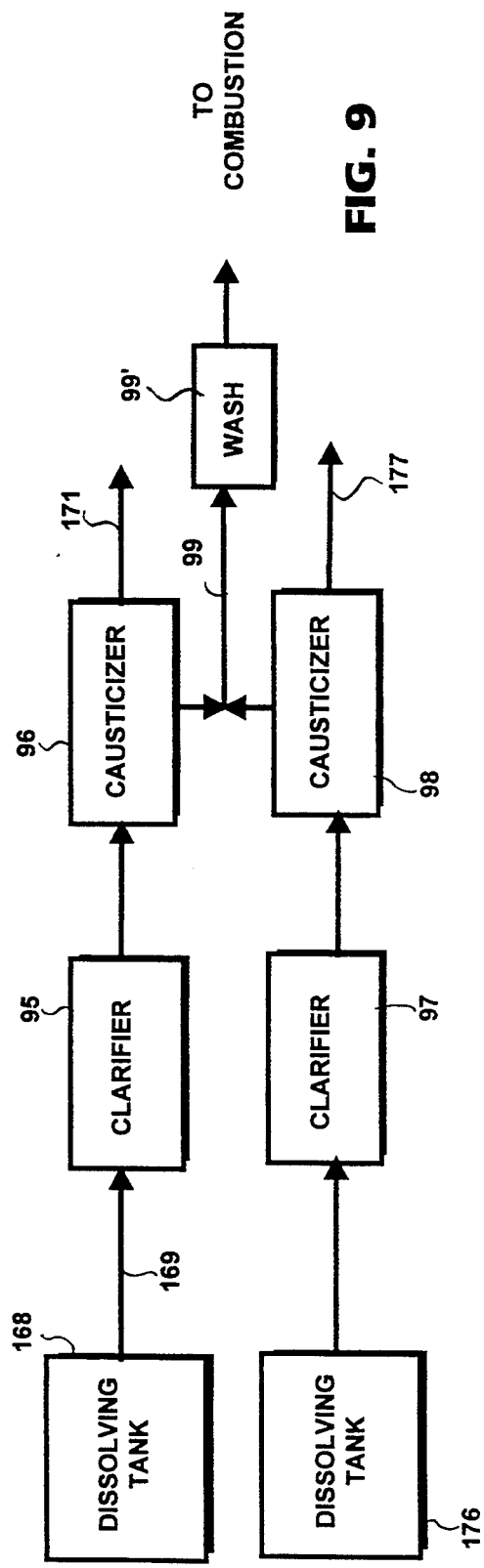
FIG. 9 is a schematic diagram like that of FIG. 7 only illustrating an alternative procedure.

FIG. 9 schematically illustrates a modified form of the system of FIG. 7. In its modified form, structures having the same function as those of the FIG. 7 embodiment are illustrated by the same reference numeral only preceded by a "1".

In the embodiment of FIG. 9, the cooking liquor from dissolving tank 168 in line 169, passes through a conventional clarifier 95 and then to a causticizer 96, to produce the final low sulfidity white liquor in line 171. Similarly, the high sulfidity liquor in dissolving tank 176 passes to clarifier 97 and causticizer 98 to produce a high sulfidity white liquor 177. The lime mud separated from the causticizers 96, 97 passes into common line 99, and then is washed in wash stage 99' and then passed to a lime reburning kiln or the like.

It will thus be seen that according to the present invention methods and apparatus have been provided which greatly enhance the ability to produce cellulose pulp using sulfur-containing cooking chemical in an efficient, and effective manner. According to the invention very low kappa number pulps can be produced (e.g. on the order of 2) prior to bleaching, and the liquids produced can be tailored to the particular desired situation in which they are used in the pulp mill, with clearly advantageous results. The invention thus allows the production of stronger pulp, having a lower kappa number, and/or higher yield, typically with less capital investment.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

I claim:

1. A method of recovering chemicals during the production of cellulose pulp using sulfur containing chemicals, comprising the steps of:
   (a) providing a first fluid waste stream of sulfur containing chemicals from the production of cellulose pulp, having a first sulfur content;
   (b) providing a second fluid waste stream of sulfur-containing chemicals from the production of cellulose pulp having a second sulfur content, greater than the first sulfur content;
   the first and second fluid waste streams being formed by heating a waste liquor to drive off sulfur-containing gases, recovering the sulfur from the sulfur-containing gases, and splitting the heated waste liquor into the first and second different waste streams; then
   (c) combusting the first and second fluid waste streams separately to produce first and second melts, the second melt having the second sulfur content, and the first melt the first sulfur content;
   (d) prior to, or coincident with, step (c) adding the recovered sulfur only to the second of the split streams;

(e) dissolving the first and second melts to produce first and second liquors, the first liquor having the first sulfur content, and the second sulfur having the second sulfur content;

and wherein step (c) is practices by providing a soda recovery boiler having at least two different melt sections, and wherein the first waste stream is led to one melt section, and the second waste stream is led to another melt section.

2. A method as recited in claim 1 comprising the further step (f) of adding other sulfur-containing constituents from the production of cellulose pulp to the second split stream prior to or coincident with the practice of step (c) for that stream.

3. A method as recited in claim 2 wherein step (f) is practices by adding one or more of the following constituents to the second split stream:
fly ash from a soda recovery boiler; waste acid from a tall-oil plant; waste acid from a chlorine dioxide plant; and sulfurous discharge gas from a pulp digester.

4. A method as recited in claim 1 wherein steps (a)–(e) are practiced to produce a first liquor having a sulfidity of about 30% or less, and a second liquor having a sulfidity of about 50–90%.

5. A method as recited in claim 4 comprising the further step of treating the first liquor with oxygen to increase the hydroxide ion concentration thereof, and comprising the further step of, without intervening causticization, treating the cellulose pulp in later stages of cook with the hydroxide-ion concentration enhanced first liquor.

6. A method as recited in claim 4 comprising the further step of, without intervening cauticization, treating the cellulose pulp in the initial stages of cook with the second liquor.

7. A method as recited in claim 1 comprising the further step of causticizing one or both of the first and second liquors.

8. A method as recited in claim 7 wherein the first liquor is causticized to produce white liquor, and comprising the further step of oxidizing the white liquor so produced.

9. A method as recited in claim 8 wherein the second liquor is not cauticized, but is added directly to the cellulose pulping without causticization.

10. A method as recited in claim 1 comprising the further step of oxidizing at least one of the first and second melts prior to the step (e).

11. A method receiving chemicals during the production of cellulose pulp using sulfur-containing chemicals, comprising the steps of:
(a) providing a first fluid waste stream of sulfur containing chemicals from the production of cellulose pulp, having a first sulfur content;
(b) providing a second fluid waste stream of sulfur containing chemicals from the production of cellulose pulp having a second sulfur content, greater than the first sulfur content;
(c) combusting the first and second fluid waste streams separately to produce first and second melts, the second melt having the second sulfur content, and the first melt the first sulfur content; and
(d) dissolving the first and second melts to produce first and second liquors, the first liquor having the first sulfur content, and the second sulfur having the second sulfur content; and wherein step (c) is practiced by providing a soda recovery boiler having at least two different melt sections, and wherein the first waste stream is led to one melt section, and the second waste stream is led to another melt section.

12. A method as recited in claim 11 wherein the first and second fluid waste streams are formed by heating a waste liquor to drive off sulfur-containing gases, recovering the sulfur from the sulfur-containing gases, splitting he heated waste liquor into the first and second different waste streams prior to step (c); and prior to, or coincident with, step (c) adding the recovered sulfur to only the second of the split streams.

13. A method as recited in claim 11 comprising the further step of combining the waste gas streams from the different melt sections of the recovery boiler.

14. A method as recited in claim 13 wherein the melt section producing the first melt is vertically about the melt section producing the second melt, off gases containing sodium being discharged from the section producing the first melt and reacting with off gases containing sulfur from the melt section producing the second melt to enhance removal of sulfur from the off gases, and thereby lower the total discharge of sulfur from the recovery boiler off gases.

15. A method as recited in claim 11 comprising the further step of maintaining oxidizing conditions in the melt section to which the first waste stream is led so as to produce oxidized melt containing $Na_2SO_4$ as the first melt, and maintaining reducing conditions in the melt section to which the second waste stream is led.

16. A method recovering chemical during the production of cellulose pulp using sulfur-containing chemicals, comprising the steps of:
(a) providing a first fluid waste stream of sulfur-containing chemicals from the production of cellulose pulp, having a first sulfur content;
(b) providing a second fluid waste stream of sulfur-containing chemicals from the production of cellulose pulp having a second sulfur content, greater than the first sulfur content; (c) combusting the first and second fluid waste streams separately to produce first and second melts, the second melt having the second sulfur content, and the first melt the first sulfur content;
(d) dissolving the first and second melts to produce first and second liquors, the first liquor having the first sulfur content, and the second sulfur having the second sulfur content;
steps (a)–(d) being practiced to produce a first liquor having a sulfidity of about 30% or less, and a second liquor having a sulfidity of about 50–90%;
(e) treating the first liquor with oxygen to increase the hydroxide-ion concentration thereof;
(f) without intervening casuticization, treating the cellulose pulp in later stages of cook with the hydroxide-ion concentration enhanced first liquor;
and wherein step (c) is practiced by providing a soda recovery boiler having at least two different melt sections, and wherein the first waste stream is led to one melt section, and the second waste stream is led to another melt section.

17. A method recovering chemicals during the production of cellulose pulp using sulfur containing chemicals, comprising the steps of:
(a) providing a first fluid waste stream of sulfur containing chemicals from the production of cellulose pulp, having a first sulfur content;

(b) providing a second fluid waste stream of sulfur-containing chemicals from the production of cellulose pulp having a second sulfur content, greater than the first sulfur content;
(c) combusting the first and second fluid waste streams separately to produce first and second melts, the second melt having the second sulfur content, and the first melt the first sulfur content;
(d) dissolving the first and second melts to produce first and second liquors, the first liquor having the first sulfur content, and the second sulfur having the second sulfur content;
(e) causticizing only the first liquor, to produce white liquor, and oxidizing the white liquor so produced;
(f) adding the second liquor directly to the cellulose pulp without causticization of the second;

and wherein step (c) is practiced by providing a soda recovery boiler having at least two different melt sections, and wherein the first waste stream is led to one melt section, and the second waste stream is led to another melt section.

* * * * *